Aug. 28, 1945.  H. S. OGDEN  2,383,813
ELECTRIC MOTOR CONTROL SYSTEM
Filed May 12, 1944

Inventor:
Harold S Ogden,
by Harry E. Dunham
His Attorney.

Patented Aug. 28, 1945

2,383,813

UNITED STATES PATENT OFFICE

2,383,813

ELECTRIC MOTOR CONTROL SYSTEM

Harold S. Ogden, Erie, Pa., assignor to General Electric Company, a corporation of New York Application May 12, 1944, Serial No. 535,331

10 Claims. (Cl. 172—179)

My invention relates to electric motor control systems, and particularly to systems of control for automatically transferring vehicle traction motor connections between series and parallel circuit relation.

It is one object of my invention to provide a system of automatic control effective both to transfer vehicle traction motors from series to parallel circuit relation at a suitable point in their accelerating sequence and also to retransfer the motors from parallel to series circuit relation whenever operating conditions render it desirable.

It is a further object of my invention to provide an automatic series-to-parallel transfer system of the above type particularly applicable to self-propelled vehicles of the gas- and Diesel-electric type.

It is a still further object of my invention to provide a series-to-parallel transfer and retransfer motor control system in which the operating sequence is different upon retransfer from that upon transfer, each operating sequence being particularly suited to the characteristic conditions of operation encountered.

Figure 1:
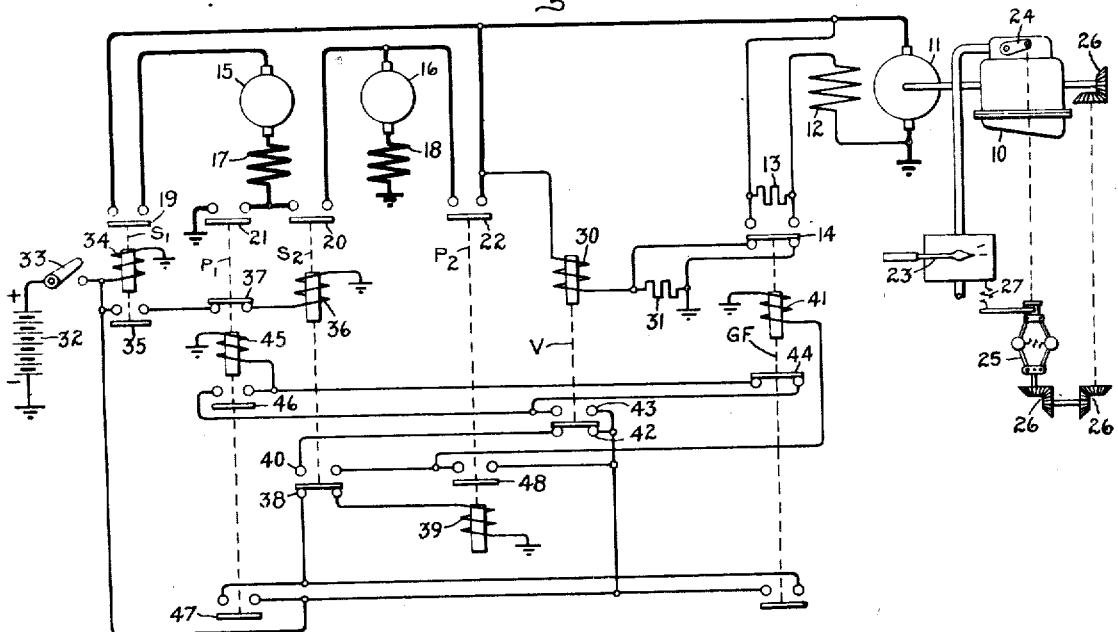
Figure 3:
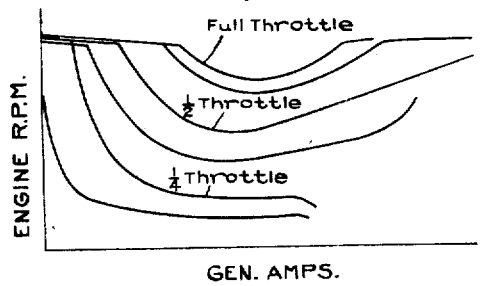
Figure 2:
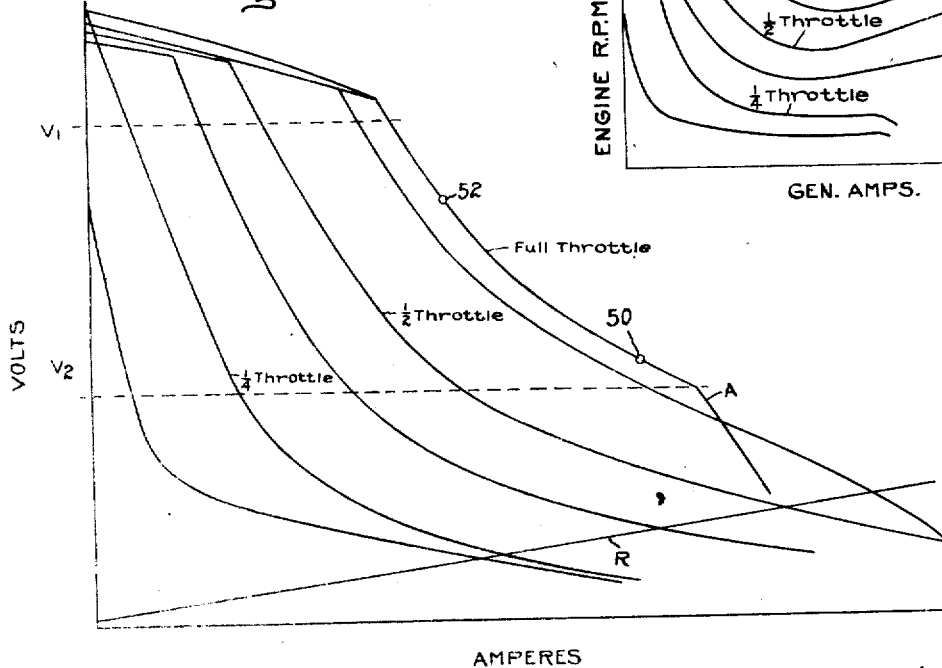

My invention will be more fully understood and its objects and advantages further appreciated by referring now to the following detailed specification taken in conjunction with the accompanying drawing, in which Fig. 1 is a schematic circuit diagram of an electric vehicle motor control system embodying my invention in one form, and Figs. 2 and 3 are graphical representations of certain of the operating characteristics of the vehicle propulsion system illustrated at Fig. 1.

Referring now to the drawing, I have illustrated at Fig. 1 an electric vehicle propulsion system comprising a prime mover 10, which may be a Diesel or other internal combustion engine, connected to drive a main generator 11 having a shunt field exciting winding 12 connected across the generator armature in series with a field reducing resistor 13. In order fully to energize the generator 11, the resistor 13 is arranged to be shunted by a contact 14 of a generator field contactor GF. The armature of the generator 11 is arranged to supply current either in series or parallel circuit relation to a pair of electric traction motors 15 and 16 provided, respectively, with series field exciting windings 17 and 18. For this purpose, there are provided a pair of series contactors $S_1$ and $S_2$ having main contacts 19 and 20, respectively, which when in their circuit closing positions, connect the motors 15 and 16 in series circuit relation, and a pair of parallel contactors $P_1$ and $P_2$ having main contacts 21 and 22, respectively, which when in their circuit closing positions, connect the motors 15 and 16 in parallel circuit relation.

The engine 10 is provided with a manually controllable throttle lever 23 and a governor controlled throttle lever 24 connected to a speed responsive governor 25. The governor speed responsive mechanism is driven from the engine 10 through suitable gearing 26 and is provided with a two-position biasing spring 27. The spring 27 is controlled by the operator's throttle lever 23 so that when the lever 23 is in its "idle" position the governor will control the fuel supplied to the engine to maintain the engine running at idling speed. In all other positions of the throttle lever 23 the governor spring 27 is set to maintain maximum engine speed and the governor will reduce the fuel supply only whenever such speed is exceeded. The throttle lever 23 determines by its position the maximum amount of fuel which may be supplied to the engine. In normal operation a governor of this type functions only to hold either of two speeds constant, i. e. idling speed or full speed. As the load comes on the actual engine speed will vary and will fall somewhere between the normal full speed and the idling speed, in dependence upon the manual throttle position and the load.

It is quite generally understood that, with the throttle held in any predetermined fixed position and the engine kept fully loaded by the generator, the horsepower output of an engine controlled in the manner described is substantially constant withon a predetermined range of variation of generator current and voltage. Accordingly, the horsepower output of the generator is constrained to follow a similar characteristic, differing only by the amount of the losses in the dynamoelectric machine. At Fig. 2, I have shown a group of generator output characteristic curves drawn for various selected fixed engine throttle openings. It will be observed that these curves are limited at the high voltage end by the maximum voltage of the generator and at the high current end by the resistance characteristic or IR line of the traction motors. This straight line represents the manner in which generator current increases with the traction motors at standstill and before sufficient torque has been built up in the motors to initiate acceleration of the vehicle. At Fig. 3 I have shown a group of engine speed characteristic curves corresponding respectively to the generator characteristic curves of Fig. 2.

The above-described generator output characteristic permits the use of a simple generator voltage relay to effect transfer and retransfer of the motor connections between series and parallel circuit relation. This will be evident when it is realized that, when operating upon a constant horsepower curve, a change of the motors from series to parallel circuit relation causes the generator current and voltage to change in a 2:1 ratio. Thus, the current increases to double its former value and the generator voltage decreases to one-half its former value. The generator current and voltage therefore stabilize upon the substantially same constant horsepower curve at double the current and half the voltage at which the change was initiated. In this manner change of motor connections may be effected without the imposition of a sudden change in load upon the engine. The same is true in an opposite sense upon retransfer of the motor connections from parallel to series circuit relation.

For the purpose of thus effecting transfer and re-transfer of the traction motor connections between series and parallel circuit relation, I provide a voltage responsive relay V having an actuating winding 30 connected across the armature of the generator 11 and arranged to pick up at a predetermined voltage and to drop out at slightly less than one-half the pick-up voltage. In order to ensure that voltage transients will not cause false drop-out of the relay V during forward transferring operation, I connect in series circuit relation with the actuating winding 30 a current limiting resistor 31 arranged to be short-circuited by the contact 14 of the generator field contactor GF when the contactor GF is in its deenergized position. By shunting of the resistor 31 the drop-out voltage of the relay V is reduced below its normal value, thereby to ensure that the transfer relay V will not drop out during transfer as a result of any temporary decrease in generator voltage below the normal drop-out value of the transfer relay.

Control power for the various contactors is supplied from a suitable source of unidirectional current supply, such as a battery 32, through a manually operable control switch 33.

With the foregoing understanding of the function and arrangement of the various elements of the control system of Fig. 1, the mode of operation of the system as a whole will now be understood from the following brief description.

Assuming that the engine 10 is running and that the manual control switch 33 is open, acceleration of the vehicle may be initiated by closing the control switch 33 fully to energize the generator 11 and thereby to supply current to the traction motors 15 and 16. Upon closure of the switch 33, an energizing circuit is first completed for an actuating winding 34 of the motor series switch $S_1$. When the contactor $S_1$ picks up, it closes a normally open interlock contact 35. The contact 35 completes an energizing circuit for an actuating winding 36 of the motor series contactor $S_2$. This last-named energizing circuit may be traced from the positive terminal of the battery 32 through the control switch 33, the interlock contact 35 on the contactor $S_1$, an interlock contact 37 on the motor parallel contactor $P_1$, and the actuating winding 36 to ground. When the motor series contactor $S_2$ picks up, it opens a pair of normally closed interlock contacts 38 to prevent energization of the actuating winding 39 of the motor parallel contactor $P_2$, and substantially simultaneously closes a pair of normally open interlock contacts 40 to complete an energizing circuit for an actuating winding 41 of the generator field contactor GF. The energizing circuit for the winding 41 may be followed from the positive terminal of the battery 32 through the control switch 33, a pair of normally closed contacts 42 on the voltage transfer relay V, the interlock contact 40 on the motor series contactor $S_2$, and the actuating winding 41 to ground. When the generator field contactor GF picks up, its contact 14 shunts the generator field resistor 13, thereby fully to energize the generator so that an accelerating current is supplied to the traction motors. Since the series contactors $S_1$ and $S_2$ are now closed, the motors 15 and 16 are connected in series circuit relation and acceleration of the vehicle is initiated.

Assuming now that the engine throttle is fully open and referring to Fig. 2, it will be observed that the generator current first increases along the IR line R of Fig. 2 and thence up the full throttle constant horsepower curve A. Assuming that the voltage transfer relay V is set to pick up at a value of generator voltage indicated upon the curves of Fig. 2 by the broken line $v_1$, the motors 15 and 16 will remain in series circuit relation until the generator voltage attains such value.

When the generator voltage attains the value $v_1$, the transfer relay V picks up to open its normally closed contacts 42 and close a pair of normally open contacts 43. As soon as the normally closed contacts 42 are opened the circuit of the actuating winding 41 on the generator field contactor GF is disabled and the contactor GF drops out.

It will be observed that forward transfer of the motors from series to parallel circuit relation is initiated at a high voltage point on the generator characteristic curve. It is therefore necessary to reduce the energization of the generator during transfer operation in order to keep the generator current within permissible limits. For this purpose, forward transfer is initiated, as pointed out above, by first dropping out the generator field contactor GF. With such sequence, the flux in the field of the generator begins to collapse considerably before any of the transfer switches have been actuated, so that no transfer resistor is needed to limit the current.

When the voltage transfer relay V closes its contacts 43, an energizing circuit is completed for the motor parallel switch $P_1$. This energizing circuit may be traced from the positive terminal of the battery 32 through the control switch 33, the transfer relay contact 43, a normally closed interlock contact 44 on the generator field contactor GF, and an actuating winding 45 of the parallel contactor $P_1$ to ground. When the contactor $P_1$ picks up, it closes an interlock contact 46 which completes a lock-in circuit around the generator field contactor interlock contact 44. Closure of the motor parallel switch $P_1$ also disables the energizing circuit for the series contactor $S_2$ at the interlock contact 37 of the contactor $P_1$. When the motor parallel contactor $P_1$ picks up, it also completes, through a normally open interlock contact 47, an energizing circuit for the actuating winding 39 of the motor parallel contactor $P_2$. This energizing circuit may be traced from the positive terminal of the battery 32 through the control switch 33, the interlock contact 47 on the contactor P₁, the normally closed interlock contact 38 on the motor series contactor S₂, and the actuating winding 39 of the contactor P₂ to ground.

Since the motor contactors P₁, S₂, and P₂ are interlocked in the manner described above, it will now be observed that the following sequence has been carried out. When the contactor P₁ picked up, it short-circuited the motor 16 by closure of its main contact 21. Upon subsequent opening of the contactor S₂, the short-circuited motor 16 was disconnected from the circuit. When the parallel contactor P₂ picked up upon the drop-out of the series contactor S₂, the disconnected motor 16 was connected in parallel circuit relation with the motor 15.

Upon energization of the parallel contactor P₂, the final step of forward transfer is initiated by completion of an energizing circuit for the actuating winding 41 of the generator field contactor GF. This energizing circuit may be traced from the positive terminal of the battery 32 through the control switch 33, a normally open interlock contact 48 on the contactor P₂ and the actuating winding 41 of the generator field contactor GF to ground. Transfer of the motors to parallel circuit relation is now complete, and generator operation is stabilized at some point on the constant horsepower curve 2 in the region of a point 50 at which the generator current is approximately twice as great and the generator voltage only half as large as at the instant forward transfer was initiated by the voltage transfer relay V.

As pointed out above, the voltage transfer relay V is so designed that, while it will not pick up until the generator voltage has attained a value $v_1$, it likewise will not drop out until the generator voltage has decreased considerably, as to a value $v_2$ which is slightly less than the voltage at the point 50. Therefore, when transfer to parallel operation is complete, the voltage transfer relay V remains picked up to maintain the motors connected in parallel circuit relation. It will be recalled, however, that during forward transfer operation it was found desirable to deenergize the generator field contactor GF in order to decrease the excitation of the generator 11. It is conceivable that the generator voltage may temporarily be reduced below the value $v_2$ during transfer operation, especially in view of the fact that the generator field contactor GF is deenergized during transfer. In the event that the generator voltage were temporarily so reduced, the voltage transfer relay V would drop out thereby to interrupt the transfer sequence and to initiate an undesirable pumping action. It is for the purpose of avoiding such possible defective operation that the resistor 31 in series with the actuating winding 30 of the voltage transfer relay V is shunted by the generator field contactor contact 14 during the transfer sequence. With the resistor 31 thus shunted, the drop-out voltage of the transfer relay V is reduced appreciably below the value $v_2$, so that all danger of dropping out the relay V as a result of a temporary generator voltage decrease is avoided.

It will be understood that in normal operation, after transfer of the motors to parallel circuit relation, the generator voltage will increase along the constant horsepower curve A to some point, such as a point 52, where the power output of the motors is exactly balanced by the resistance to motion of the vehicle, so that acceleration ceases and the vehicle moves forward at a constant speed.

If, now, the engine output is reduced by the operator, or the motors encounter a sudden increase in load, such as an uphill grade, the generator voltage will be reduced. It has been found desirable to retransfer the motors from parallel to series circuit relation in the event that operating conditions are such as to reduce the generator voltage below the value $v_2$. Under such conditions, it is not necessary nor even desirable to reduce the energization of the generator field during retransfer. It will be noted that retransfer of the motors from parallel to series circuit relation is always initiated when the generator voltage is at a low value, so that it is desired to build up the generator field strength and voltage at as high a rate as possible. To aid such build-up the generator field contactor GF is not opened during retransferring operation. Retransferring takes place in the following manner.

As soon as the generator voltage decreases to the value $v_2$, the generator transfer relay V drops out, first opening its contacts 43 and thereafter closing its contacts 42. When the contacts 43 are opened, the energizing circuit for the actuating winding 45 of the motor parallel contactor P₁ is disabled. Closure of the relay contacts 42 prepares a holding circuit for the actuating winding 41 of the generator field contactor GF, so that this contactor will remain energized despite subsequent drop-out of the motor parallel contactor P₂. When the contactor P₁ drops out, the motor 15 is disconnected from the generator circuit and the normally closed interlock contact 37 of the contactor P₁ completes an energizing circuit for the actuating winding 36 of the motor series contactor S₂. When the contactor S₂ picks up, the traction motor 15 is reconnected in the generator circuit, but is shunted by the main contact 22 of the motor parallel contactor P₂. Energization of the contactor S₂ also completes a holding circuit for the actuating winding 41 of the generator field contactor GF. This holding circuit includes the voltage transfer relay contacts 42 and the interlock contacts 40 on the contactor S₂. Actuation of the series contactor S₂ also disables, at its interlock contact 38, the energizing circuit for the actuating winding 39 of the motor parallel contactor P₂. The motor parallel contactor P₂ thereupon drops out to unshunt the motor 16 and leaves the motors 15 and 16 connected to the generator 11 in series circuit relation.

From the foregoing description of the operating sequence during retransfer of the motors from parallel to series circuit relation, it will be observed that during retransfer the generator field contactor GF remains energized, so that the generator excitation is maintained at a maximum and the pick-up voltage of the voltage transfer relay V is maintained at its normal value by reason of the fact that the resistor 31 is not shunted as during forward transfer operation.

While I have described only a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States, is:

1. An electric power system comprising an internal combustion engine, a direct current generator driven by said engine, a pair of direct current electric motors, switching means for connecting said motors to said generator in series or parallel circuit relation, a relay responsive to the voltage of said generator for controlling said switching means to transfer said motors between series and parallel circuit relation, and means for temporarily reducing the drop-out voltage of said relay during said transfer operation.

2. An electric motor control system comprising a variable voltage generator, a pair of electric motors, switching means for connecting said motors to said generator in series or parallel circuit relation, a relay arranged to control said switching means and energized in response to a predetermined generator voltage to effect transfer of said motors from series to parallel circuit relation, and means controlled by said switching means for reducing the drop-out voltage of said relay during said transfer operation.

3. An electric vehicle propulsion system comprising a variable voltage generator, a pair of electric traction motors, switching means for connecting said motors to said generator in series or parallel circuit relation, second switching means for reducing the excitation of said generator, a relay responsive to the voltage of said generator for controlling said first and second switching means, said relay being arranged for energization at a predetermined generator voltage simultaneously to reduce the excitation of said generator and to effect transfer of said motors from series to parallel circuit relation, and means controlled by said second switching means for reducing the drop-out voltage of said relay during said transfer operation.

4. An electric vehicle propulsion system comprising an internal combustion engine, a direct current generator driven by said engine, a pair of direct current electric traction motors, switching means for connecting said motors to said generator in series or parallel circuit relation, second switching means for controlling the excitation of said generator, a relay responsive to the voltage of said generator for controlling said first and second switching means, said relay being arranged to pick up at a predetermined generator voltage to reduce the excitation of said generator and initiate transfer of said motor from series to parallel circuit relation and having a drop-out voltage no greater than one-half its pick-up voltage, and means controlled by said relay for temporarily reducing said drop-out voltage below its normal value during switching operation.

5. A power system comprising an internal combustion engine, a direct current generator driven by said engine, a pair of direct current motors, switching means for connecting said motors to said generator in series or parallel circuit relation, a relay responsive to the voltage of said generator for controlling said switching means to transfer said motors from series to parallel circuit relation and to retransfer said motors from parallel to series circuit relation, said relay picking up at a predetermined generator voltage to effect transferring operation and dropping out at a lower generator voltage to effect retransferring operation, and means controlled by said switching means temporarily to reduce the drop-out value of said relay only during said transfer operation of said motors from series to parallel circuit relation.

6. An electric vehicle propulsion system comprising an internal combustion engine, a direct current generator driven by said engine, a pair of direct current electric traction motors, switching means for connecting said motors to said generator in series or parallel circuit relation, second switching means for controlling the field excitation of said generator, a relay responsive to the voltage of said generator for controlling said first and second switching means, said relay being arranged to pick up at a predetermined high generator voltage to effect field reducing operation of said second switching means and to actuate said first switching means to transfer of said motors from series to parallel circuit relation, said first switching means being arranged upon drop-out of said relay to effect retransfer of said motors from parallel to series circuit relation and to render said second switching means ineffective to reduce the generator field excitation, and means controlled by said second switching means for temporarily reducing the drop-out voltage of said relay during said transfer operation.

7. An electric motor control system comprising a direct current generator, a pair of direct current motors, a plurality of interlocked switching means for connecting said motors to said generator in series or parallel circuit relation, and a relay responsive to the voltage of said generator for controlling said switching means to transfer said motor from series to parallel circuit relation and to retransfer said motors from parallel to series circuit relation.

8. An electric power system comprising an internal combustion engine, a direct current generator driven by said engine, a pair of direct current motors, switching means for connecting said motors to said generator in series or parallel circuit relation, a relay responsive to the voltage of said generator for controlling said switching means, said relay picking up at a predetermined high generator voltage to transfer said motors from series to parallel circuit relation and dropping out at a predetermined low generator voltage to retransfer said motors from parallel to series circuit relation, and means controlled by said relay for reducing the excitation of said generator during said transfer operation and maintaining said excitation at its full value during said retransfer operation.

9. An electric power system comprising an internal combustion engine, a direct current generator driven by said engine, a pair of direct current motors, switching means for connecting said motors to said generator in series or parallel circuit relation, a relay responsive to the voltage of said generator for controlling said switching means, said relay picking up at a predetermined high generator voltage to transfer said motors from series to parallel circuit relation and dropping out at a predetermined low generator voltage to retransfer said motors from parallel to series circuit relation, means for reducing the field excitation of said generator, means controlled by said relay for effecting operation of said field reducing means during said transfer operation, and means controlled by said switching means for rendering said field reducing means ineffective during said retransfer operation.

10. An electric vehicle propulsion system comprising an internal combustion engine, a direct current generator driven by said engine, a pair of direct current electric traction motors, a plurality of interlocked switching means for connecting said motors to said generator in series or parallel circuit relation, and a relay responsive to the voltage of said generator for controlling said switching means, said relay being arranged to pick up at a predetermined generator voltage to initiate transfer of said motors from series to parallel circuit relation and to drop out at a second predetermined generator voltage no greater than one-half said first predetermined voltage to initiate retransfer of said motors from parallel to series circuit relation.

HAROLD S. OGDEN.